(12) United States Patent
Yamashita et al.

(10) Patent No.: US 7,025,482 B2
(45) Date of Patent: Apr. 11, 2006

(54) LIGHT GUIDE MEMBER AND ILLUMINATING DEVICE

(75) Inventors: Tatsumaro Yamashita, Miyagi-ken (JP); Yuzo Hayashi, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 168 days.

(21) Appl. No.: 10/700,073

(22) Filed: Nov. 3, 2003

(65) Prior Publication Data

US 2004/0096182 A1    May 20, 2004

(30) Foreign Application Priority Data

Nov. 8, 2002    (JP)    ............... 2002-325424

(51) Int. Cl.
*F21V 9/00* (2006.01)

(52) U.S. Cl. .............. 362/511; 385/39; 385/901; 362/348

(58) Field of Classification Search .......... 362/26, 362/23, 29–30, 606, 600, 615, 617, 620, 362/626, 487–491, 341, 346, 511, 348; 385/901, 385/115–116, 121, 31, 39, 47, 147; 116/49
See application file for complete search history.

(56) References Cited

U.S. PATENT DOCUMENTS

| | | | | |
|---|---|---|---|---|
| 1,918,087 A | * | 7/1933 | Donley | 359/547 |
| 4,989,125 A | * | 1/1991 | Cobb et al. | 362/346 |
| 6,786,613 B1 | * | 9/2004 | Suzuki | 362/600 |
| 6,880,945 B1 | * | 4/2005 | Knaack et al. | 362/26 |

FOREIGN PATENT DOCUMENTS

| | | | |
|---|---|---|---|
| JP | 2000-180631 | | 6/2000 |
| WO | WO 98/26212 | * | 6/1998 |

* cited by examiner

*Primary Examiner*—Sandra O'Shea
*Assistant Examiner*—Robert May
(74) *Attorney, Agent, or Firm*—Brinks Hofer Gilson & Lione

(57) ABSTRACT

The invention provides a light guide member and an illuminating device which are able to efficiently uniformly irradiate illumination light to only an area requiring illumination. Therefore, a reflection face is constructed by reflection stripes such as many grooves, etc. widened in a concentric circle shape. Light from a light source unit is widened toward this entire reflection face without irregularities by a diffusing portion such as a reflection prism, etc. Thus, only the range actually requiring the illumination can be illuminated without irregularities, and visibility of the illumination range using a front light is raised.

9 Claims, 5 Drawing Sheets

LIGHT GUIDE MEMBER AND ILLUMINATING DEVICE

BACKGROUND OF THE INVENTION

1. Field of the Invention

The present invention relates to a light guide member for propagating light from an incident face toward an emitting face and an illuminating device having this light guide member.

2. Description of the Related Art

In a reflection type liquid crystal display device for performing a displaying operation with circumferential light as a light source, its brightness is influenced by the light amount of the circumferential light. Therefore, in an environment in which no sufficient circumferential light is obtained at the time of using in a dark place, etc., visibility of the display is extremely reduced. Therefore, a liquid crystal display device having a front light (face light emitting illuminating device) arranged on the front face side of the liquid crystal display unit (liquid crystal display element) of the reflection type, and used as an auxiliary light source is proposed. This liquid crystal display device having the front light is operated as the normal reflection type liquid crystal display device in an environment in which the circumferential light is sufficiently obtained in the outdoors during the daytime, etc. In this liquid crystal display device, the above front light is turned on and is used as a light source in accordance with necessity.

The front light has a light guide member forming a reflection face constructed by many fine grooves and prisms on its surface to uniformly illuminate the inside of the face of the liquid crystal display unit without irregularities. The wide face can be illuminated in uniform brightness by the action of such a reflection face even when a dot light source and a line light source are used as the light source. (For example, see Patent literature 1).

[Patent Literature 1]

JP-A-2000-180631

The utilization of the front light is being considered in various uses as an efficient illuminating means excellent in illumination ability. In consideration of such a present situation, the front light having a further suitable illumination ability in accordance with the shape and the utilization mode of an illuminated object has been desired.

SUMMARY OF THE INVENTION

The present invention is made in consideration of the above situation, and an object of the present invention is to provide a light guide member and an illuminating device which are able to efficiently and uniformly irradiate the illumination light to only an area requiring the illumination.

To achieve the above object, the present invention provides a light guide member comprising an incident face for introducing light irradiated from a light source; an emitting face for emitting the light; a reflection face constructed by many reflection stripes widened in a concentric circle shape from the center toward the outside, and reflecting the light introduced from the incident face toward the emitting face; and a light guide portion for propagating the light between the incident face and the emitting face.

In accordance with such a light guide member, the illumination light emitted from the emitting face is illuminated to only the same range as the shape of the reflection face. If the shape of the reflection face is set to the range actually requiring the illumination, only the range actually requiring the illumination is illuminated and no illumination light is irradiated to its circumference. Thus, the difference in contrast between the circumferential portion and the illumination range is raised and visibility of the illumination range is further raised.

The reflection stripes may be grooves constructed by two faces having inclination angles different from each other with respect to the emitting face, or are a reflection prism for reflecting the light on the surface. The reflection face constructed by such reflection stripes reflects the light without irregularities. A diffusing portion for diffusing the light toward the reflection face may be further arranged on the way of an optical path from the incident face to the reflection face. The diffusing portion is greatly useful to widen the light of the light source toward the reflection face without irregularities. The diffusing portion may be constructed by a reflection prism for reflecting the light on the surface.

The incident face may be formed at the center of the concentric circle of the reflection stripe. If the incident face is arranged at the center of the concentric circle of the reflection stripe, the light source can be arranged at the center of the light guide member, which contributes to the efficient diffusion of light within the light guide member. A scale may be formed on the emitting face, and an opening for extending the driving shaft of a pointer indicating the scale therethrough may be also formed at the center of the concentric circle of the reflection stripe. In such a construction, for example, it is very useful when the light guide member of the present invention is applied to the illumination of a meter portion of an instrument.

Further, the present invention provides a light guide member comprising an incident face for introducing light irradiated from a light source; an endless light guide body for propagating the light introduced from the incident face; an annular emitting face formed in the light guide body and emitting the light from an area surrounded by the light guide body toward the outside; and a reflection face formed in the light guide body and having many grooves for reflecting the light introduced from the incident face toward the emitting face.

In accordance with such a light guide member, the uniform light having no irregularities can be irradiated so as to be widened toward the outside of the endless light guide body. If this light guide member is arranged at the center of an illuminated object, the illuminated object can be brightly illuminated in a ring shape. If the above light guide member and the light source are arranged in the illuminating device, the illuminating device which is able to efficiently clearly illuminate the illuminated object of an arbitrary shape can be provided.

DESCRIPTION OF THE PREFERRED EMBODIMENTS

Figure 1A:
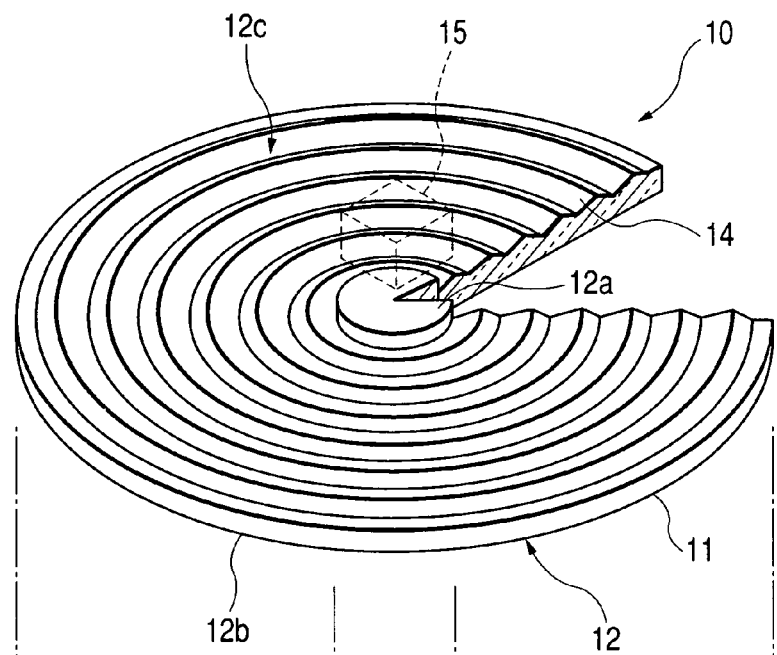
FIGS. 1A and 1B are a perspective view and a cross-sectional view showing a front light (illuminating device) in one embodiment mode of an illuminating device of the present invention.
Figure 1B:
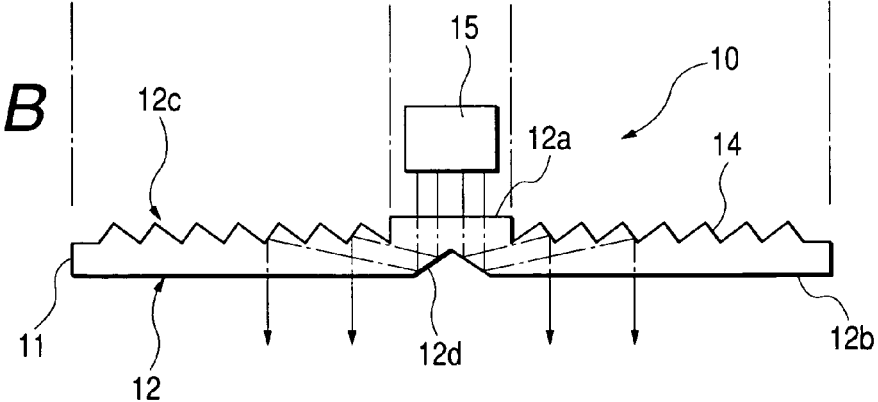

The embodiment modes of the present invention will next be explained with reference to the drawings. FIG. 1A is a partially broken perspective view of a front light (illuminating device) in one embodiment mode of an illuminating device of the present invention. FIG. 1B is a cross-sectional view of the front light shown in FIG. 1A. The front light (illuminating device) 10 is constructed by arranging a flat-shaped light guide member 12 made of a transparent resin material, and a light source unit (light source) 15 arranged on the central line of this light guide member 12.

The light guide member 12 has a light guide portion 11 formed in a transparent disc shape and propagating light in its interior, an incident face 12a formed at the-center of the light guide portion 11 and introducing light into the light guide portion 11, an emitting face 12b for emitting the light introduced into the light guide portion 11, a reflection face 12c constructed by many reflection stripes 14 widened in a concentric circle shape from the center of the light guide portion 11, and a diffusing portion 12d facing the incident face 12a.

As can be seen from FIGS. 1A and 1B, the incident face 12a is formed at the center of the concentric circle of the reflection stripe 14, and faces the light source unit, 5 and introduces light irradiated from the light source unit 15 into the light guide portion 11. For example, such an incident face 12a may be formed in a circular shape. For example, the reflection stripe 14 constituting the reflection face 12c may be a fine groove widened in the concentric circle shape. The construction of such a reflection stripe 14 will be described later in detail. The diffusing portion 12d may be a conical reflection prism in which the top extends in the incident face 12a direction. The diffusing portion 12d constructed by the reflection prism plays the role of reflecting the light introduced from the incident face 12a on the conical surface, and widening the light toward the entire area of the reflection face 12c without irregularities.

In accordance with such a construction, the light irradiated from the light source unit 15 is introduced from the incident face 12a of the light guide member 12 to the interior, and is diffused on the surface of the diffusing portion 12d toward the reflection face 12c without irregularities. The propagating direction of the light widened to the entire reflection face 12c is directed to the emitting face 12b by the action of the reflection stripe 14 constituting the reflection face 12c, and this light is emitted as illumination light of uniform illuminance from the entire emitting face 12b.

For example, the light guide member 12 may be formed by using a die engraving the reflection stripe 14 on its surface, and injection-molding a resin material such as transparent acrylic resin, etc. As the material constituting the light guide member 12, a transparent resin material such as polycarbonate-based resin, epoxy resin, etc. and glass, etc. can be used in addition to the acrylic-based resin. In this embodiment mode, the light guide portion 11 is formed in the same widened circular shape as the reflection face 12c. However, the light guide portion 11 may be also greatly widened in comparison with the reflection face 12c in conformity with a device mounting the front light 10 thereto. For example, the outer shape of the light guide portion 11 may be also formed in the shape of a square plate, etc.

If an auxiliary reflection film is further formed on the rear face side of the reflection face 12c, the brightness of the front light 10 can be raised. Further, the construction of being able to observe an illuminated object illuminated by the light emitted from the emitting face 12b from the reflection face 12c through the light guide portion 11 may be also used by raising the light transmitting property of the reflection face 12c.

Thus, the reflection stripes 14 such as many grooves, etc. widened in the concentric circle shape constitute the reflection face 12c, and the light from the light source unit 15 is widened toward this entire reflection face 12c without irregularities in the diffusing portion 12d such as a reflection prism, etc. Accordingly, only a range actually requiring illumination can be illuminated without irregularities so that visibility of the illumination range using the front light 10 is raised.

Figure 2:
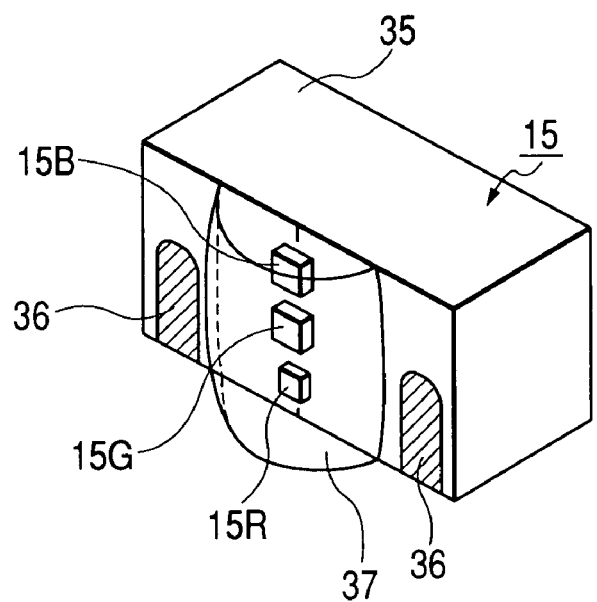
FIG. 2 is an enlarged perspective view showing a light source unit arranged in the front light.

Here, the light source unit 15 arranged in the front light 10 of this embodiment mode will be explained with reference to FIG. 2. The light source unit 15 shown in FIG. 2 is constructed by arranging a substrate 35, LEDs (light emitting diodes) 15R, 15G, 15B arrayed and formed in the central portion of the substrate 35, a condenser lens 37 made of resin and formed so as to cover these LEDs, and power terminals 36, 36 formed on the substrate 35 on both sides of the condenser lens 37. The light source unit 15 emits light toward the front face side (the arranging side of the LEDs) shown in FIG. 2. Signal terminals for controlling the respective light emitting intensities of the LEDs 15R, 15G, 15B are also arranged on the substrate 35 although this arrangement is not illustrated.

The LEDS 15R, 15G, 15B are respectively set to diodes having red, green and blue light emitting colors. These colors are added and mixed within the condenser lens 37 by controlling the light emitting intensity ratio of these LEDs, and the light converged by the lens 37 can be irradiated to the incident face 12a of the light guide member 12. The front light 10 of this embodiment mode can control its illumination light in various color tones by arranging the light source unit 15 of such a construction.

In the light source unit 15 shown in FIG. 2, the phosphors of the red, green and blue light emitting colors are respectively arranged from the lower side of FIG. 2 in a line in the longitudinal direction. However, this arranging direction and the arranging order are not particularly limited, and the respective LEDs may be also arranged in three directions. Further, in addition to the LEDS of the above three colors, a white LED may be further arranged so that the construction of raising brightness may be also used. Further, the shape of the condenser lens 37 is not limited to the shape shown in FIG. 2, but can be suitably changed to an approximately hemispherical shape, etc.

Further, this embodiment mode is constructed such that the light emitting intensities of the LEDs 15R, 15G, 15B of RGB can be freely changed. However, these light emitting intensities may not be necessarily varied. The light emitting intensity ratio can be fixed and these colors can be also set to specific light emitting colors. Further, in the construction in which the light emitting colors are fixed or are varied in a specific range, it is also possible to apply a construction for generating the light emitting colors by combining two LEDs, a construction for generating the light emitting colors by combining one LED and the color of the condenser lens 37, etc.

The color tone of the illumination light emitted from the emitting face 12b of the front light 10 can be freely changed by using the light source unit 15 of the above construction so that the illuminated object can be greatly raised in decoration and production properties.

Figure 3:
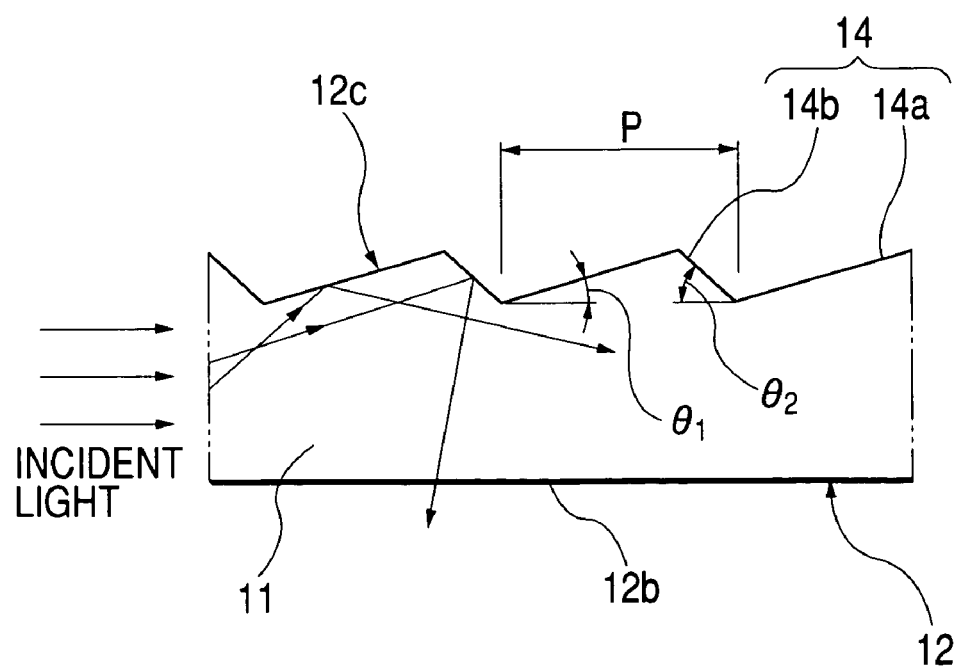
FIG. 3 is a cross-sectional view showing the construction of a reflection stripe formed on the reflection face of a light guide member.

The detailed construction of the reflection stripe 14 formed on the reflection face 12c of the light guide member 12 will be explained with reference to FIG. 3. As shown in FIG. 3, the reflection stripe 14 is a prism groove constructed by two slanting face portions slantingly formed at inclination angles different from each other with respect to the reference face of the reflection face 12c e.g., the emitting face 12b. A slanting face portion having a relatively gentle inclination angle is set to a gentle slanting face portion 14a, and a slanting face portion having an inclination angle steeper than that of the gentle slanting face portion 14a is set to a steep slanting face portion 14b. The gentle slanting face portion 14a and the steep slanting face portion 14b are alternately formed on the reflection face 12c in a concentric circle shape toward the outside from the center of the light guide member 12. For example, the inclination angle θ1 of the gentle slanting face portion 14a shown in FIG. 3 is preferably set to 1 or more and 10° or less. For example, the inclination angle θ2 of the steep slanting face portion 14b is preferably set to 41° or more and 45° or less. It is possible to form the front light of a uniform emitting light amount in the face direction of the emitting face 12b by forming the reflection stripe 14 controlled to these ranges.

When the inclination angle θ1 of the above gentle slanting face portion 14a is less than 1°, no sufficient brightness is obtained as the illuminating device. In contrast to this, when the inclination angle θ1 exceeds 10°, the uniformity of the emitting light amount from the emitting face of the light guide member is reduced so that this inclination angle is not preferable. Further, when the inclination angle θ2 of the above steep slanting face portion is less than 41° and exceeds 45°, the brightness of the illuminating device is reduced so that these inclination angles are not preferable. It is possible to restrain an interference fringe from being caused in the illuminated object by suitably changing the pitch P of the reflection stripe 14.

The reflection stripe 14 may be also constructed by a reflection prism having a refractive index different from that of the light guide portion 11 in addition to the prism grooves constructed by the two slanting face portions slantingly formed at the inclination angles different from each other with respect to the emitting face 12b. Similar effects are also obtained even when the reflection face is constructed by arranging such a reflection prism in a concentric circle shape.

Figure 4A:
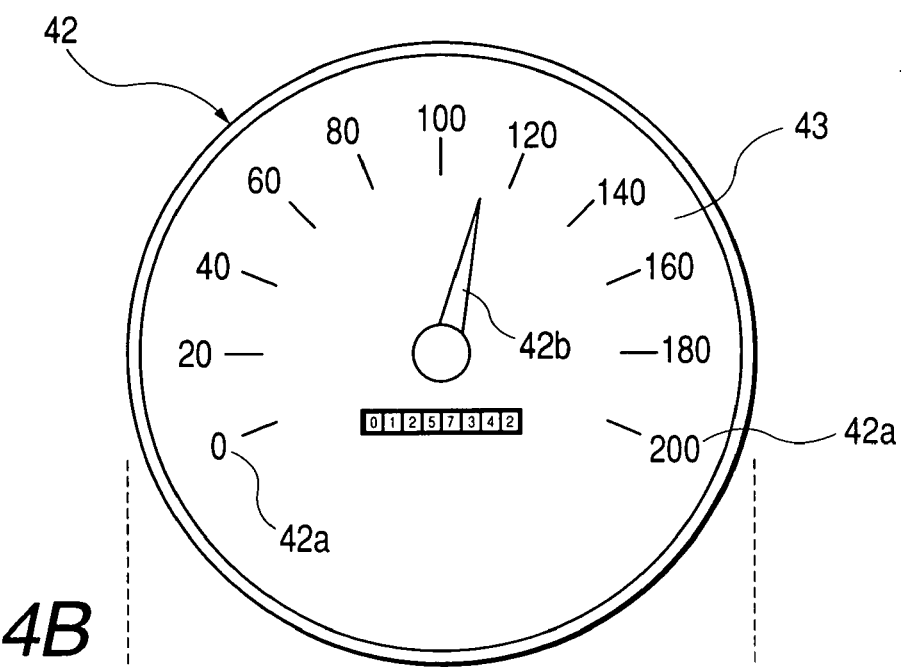
FIGS. 4A and 4B are an explanatory views showing an embodiment mode in which the front light of the present invention is used to illuminate a meter.
Figure 4B:
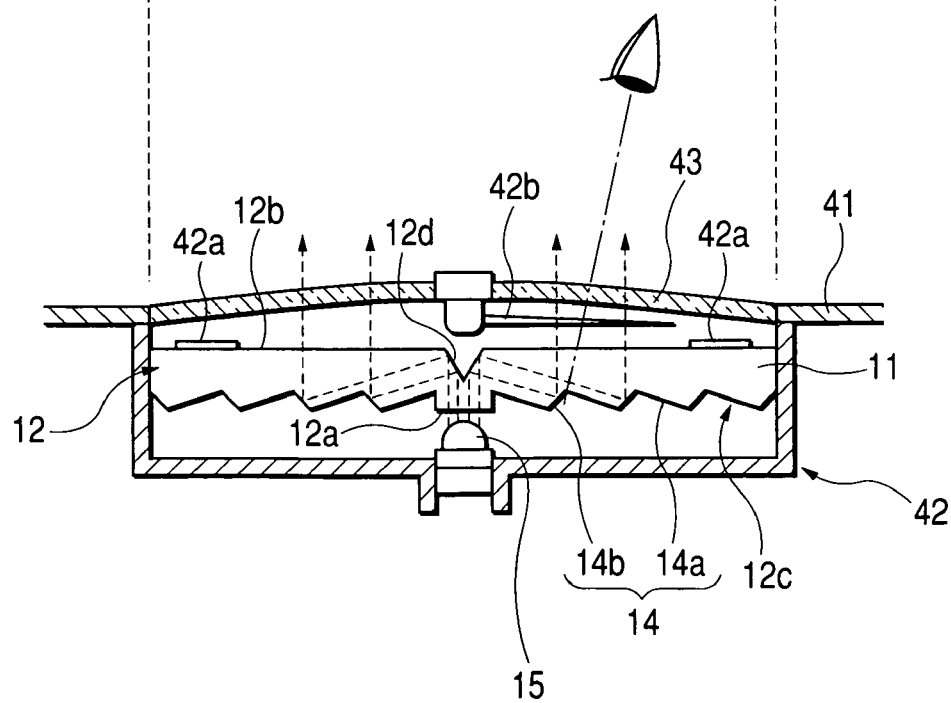

An embodiment mode applying the above front light 10 to a speed meter of a passenger car will next be explained with reference to FIGS. 4A and 4B. The detailed construction and operation of each portion of the front light 10 are similar to those in the above embodiment mode. Accordingly, the same numbers are designated in the parts of the same constructions. The front light 10 of this embodiment mode is attached into an instrument panel 41 attached to a driver's seat of the passenger car. For example, a scale 42a of the speed meter 42 is formed on the surface of the emitting face 12b of the front light 10. Namely, the light guide member 12 also plays the role of a scale panel of the speed meter 42. The upper face of the front light 10 on the emitting face 12b side is covered with a cover glass 43 of the instrument panel 41. A pointer 42b constituting the speed meter 42 is attached onto the central inside of the cover glass 43.

The reflection face 12c is constructed by two slanting face portions slantingly formed with respect to the reference face of the reflection face 12c, e.g., the emitting face 12b. The reflection face 12c is alternately formed by a gentle slanting face portion 14a set to a slanting face portion having a relatively gentle inclination angle, and a steep slanting face portion 14b formed so as to have an inclination angle steeper than that of the gentle slanting face portion 14a. Illumination light having a uniform light amount without irregularities can be irradiated on the face by the reflection stripe 14 constructed by the gentle slanting face portion 14a and the steep slanting face portion 14b.

When the light source unit 15 of the front light 10 is turned on at the illuminating time of the speed meter 42 such as a driving time in the nighttime, etc., light irradiated from the light source unit 15 is introduced into the light guide member 13 from the incident face 12a. The light introduced into the light guide member 13 is reflected on the diffusing portion 12d, i.e., the conical surface of a conical reflection prism, and is diffused toward the entire reflection face 12c without irregularities. The light incident on the reflection face 12c is reflected on the surface of the reflection face 13b and its propagating direction is changed and the illumination light is emitted from the emitting face 12b.

The illumination light emitted from the emitting face 12b illuminates the pointer 42b of the speed meter 42, and the entire emitting face 12b is brightly irradiated and the scale 42a formed on the surface of the emitting face 12b is emerged. An observer can easily read the speed meter 42 from the scale 42a clearly displayed and the pointer 42b. Further, since such a front light 10 does not illuminate the circumference of the emitting face 12b corresponding to the scale panel of the speed meter 42, the observer can easily read the speed meter 42 in high contrast. Decoration and function properties can be also raised if the displaying operation is performed while the color of the illumination light of the light source unit 15 is switched during the operation of the front light.

Figure 5A:
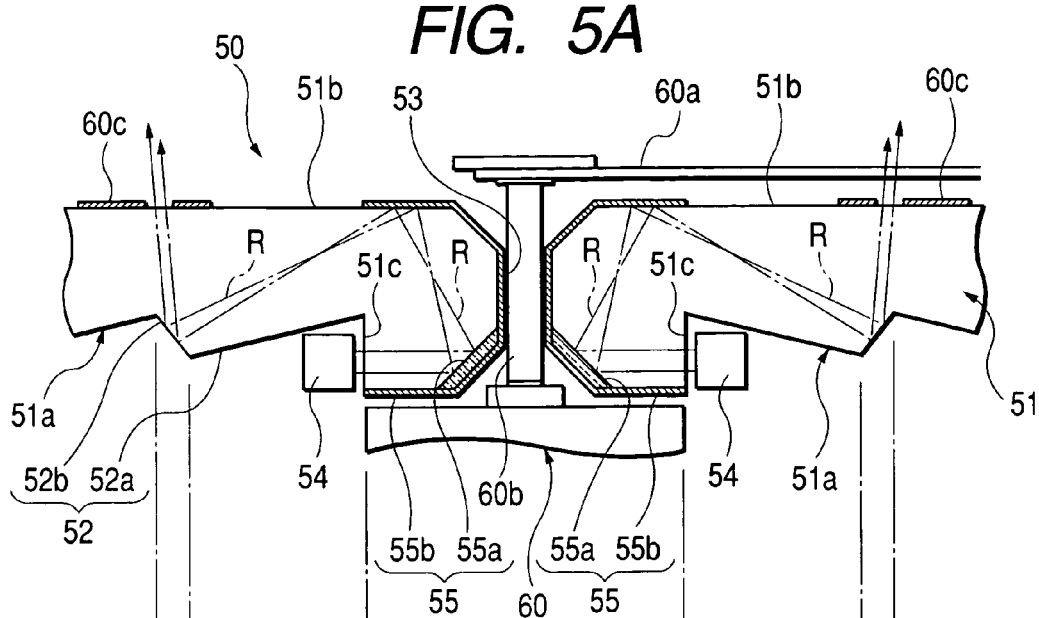
FIGS. 5A and 5B are a plan view and a cross-sectional view showing another embodiment mode of the illuminating means of the present invention.
Figure 5B:
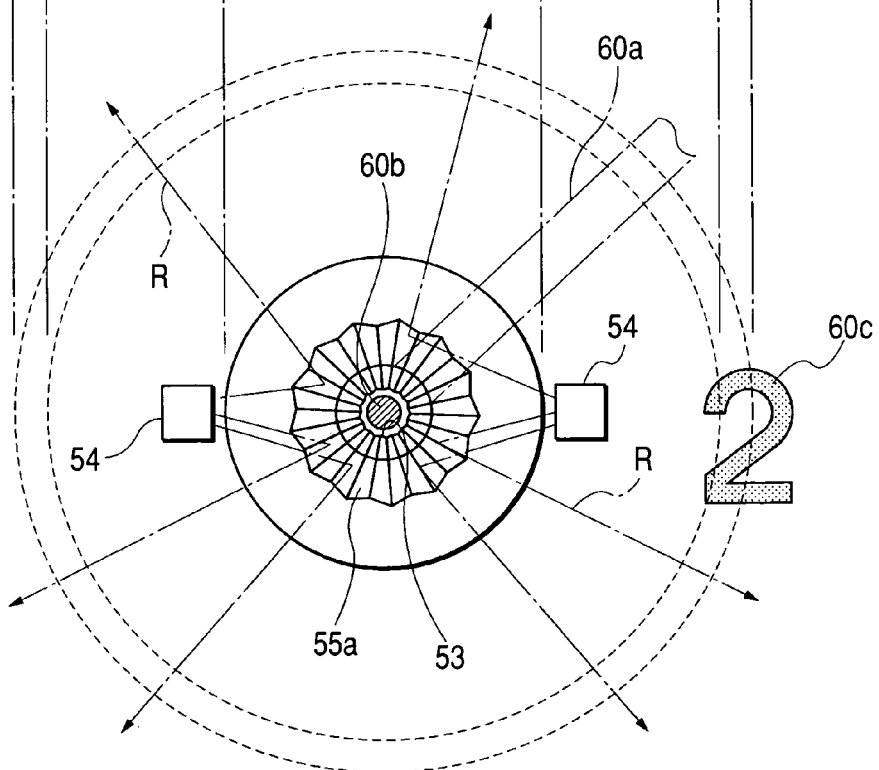

An embodiment mode in which the illuminating means of a construction different from that of the above front light is applied to the speed meter of the passenger car, will be explained with reference to FIGS. 5A and 5B. A reflection face 51a constructed by many reflection stripes 52 widened in a concentric circle shape from the center toward the outside is formed in a light guide member 51 of a disc shape constituting the illuminating means 50. Similar to the above embodiment mode, the reflection stripes 52 may be set to prism grooves constructed by a gentle slanting face portion 52a and a steep slanting face portion 52b formed so as to have an inclination angle steeper than that of the gentle slanting face portion 52a.

An opening 53 is formed at the center of the light guide member 51. A driving shaft 60b for operating the pointer 60a of a speed meter 60 extends through this opening 53. A scale 60c of the speed meter 60 is formed on the emitting face 51b of the light guide member 51. Namely, the light guide member 51 also plays the role of a scale panel of the speed meter 60. A pair of incident faces 51c, 51c widened perpendicularly to the emitting face 51b through the opening 53 are formed at the center of the reflection face 51a side of the light guide member 51. A pair of light source units 54, 54 constituting the illuminating means 50 are arranged so as to respectively face these incident faces 51c, 51c.

A diffusing portion 55 is formed at the center of the light guide member 51 so as to surround the opening 53. The diffusing portion 55 is constructed by a reflection prism 55a surrounding the opening 53 while being inclined with respect to the emitting face 51b on the reflection face 51a side of the light guide member 51, and a metallic reflection film 55b covering the light guide member 51 from its center to one portions of the upper and lower faces of this light guide member 51.

When the light source units 54, 54 of the illuminating means 50 are turned on at the illuminating time of the speed meter 60 such as a driving time in the nighttime, etc., the light irradiated from the light source units 54, 54 is introduced from the incident faces 51c, 51c into the light guide member 51. The light introduced into the light guide member 51 is reflected on the surface of the reflection prism 55a constituting the diffusing portion 55, and is again reflected on the metallic reflection film 55b, and is diffused toward the entire area of the reflection face 51a without irregularities (see arrows R in FIGS. 5A and 5B). The light incident to the reflection face 51a is reflected on the surface of the reflection face 51a and its propagating direction is changed, and the illumination light is emitted from the emitting face 51b.

The illumination light emitted from the emitting face 51b illuminates the pointer 60a of the speed meter 60, and the entire emitting face 51b is brightly irradiated, and the scale 60c formed on the surface of the emitting face 51b is emerged. An observer can easily read the speed meter 60 from the scale 60c clearly displayed and the pointer 60a. Further, since such an illuminating means 50 does not illuminate the circumference of the emitting face 51b corresponding to the scale panel of the speed meter 60, the observer can easily read the speed meter 60 in high contrast. Further, the opening 53 is formed at the center of the light guide member 51, and the driving shaft 60b for operating the pointer 60a of the speed meter 60 extends through this opening 53. Accordingly, a main mechanism for moving the pointer 60a of the speed meter 60 can be arranged on the rear face (reflection face 51b side) of the light guide member 51. Thus, it is possible to realize an illuminating means in which the light guide member 51 plays the role of the scale panel of the speed meter 60 irrespective of the size of a driving portion of the speed meter 60.

Figure 6:
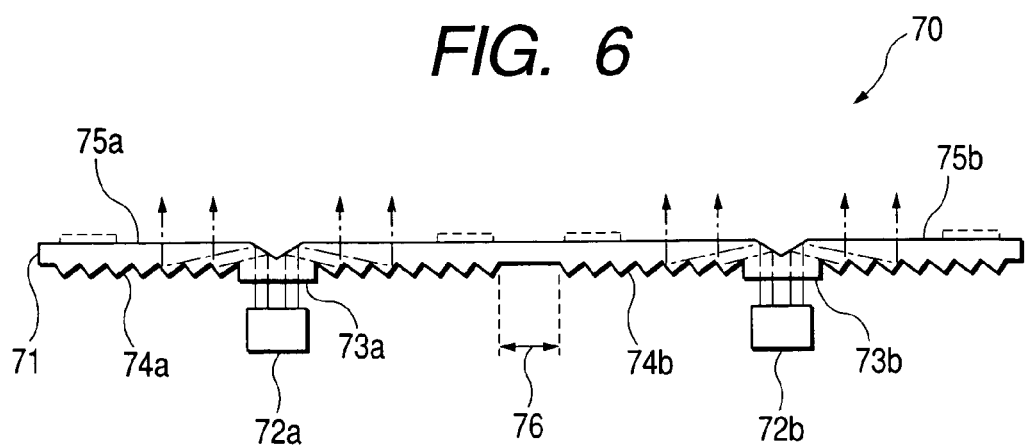
FIG. 6 is a cross-sectional view showing another embodiment mode of the illuminating means of the present invention.

In addition to the embodiment modes explained so far, for example, as shown in FIG. 6, plural emitting faces may be also formed in the light guide member. In an illuminating means 70 of this embodiment mode, a pair of light source units 72a, 72b, a pair of incident faces 73a, 73b, a pair of reflection faces 74a, 74b and a pair of emitting faces 75a, 75b are respectively formed in one continuous light guide member 71.

In such an illuminating means 70, for example, two illuminated objects such as the speed meter and a rotation number meter of the automobile, etc. can be illuminated by one front light. When the illuminated objects are separated, the portion between the reflection faces 74a and 74b is set to a flat face 76 and is extended by a necessary distance. A structure for emitting the illumination light from the emitting faces 75a, 75b of two places in one light source unit may be also used instead of the arrangement of the two light source units. Further, a construction for illuminating three or more illuminated objects by using one continuous light guide member may be also used.

Figure 7:
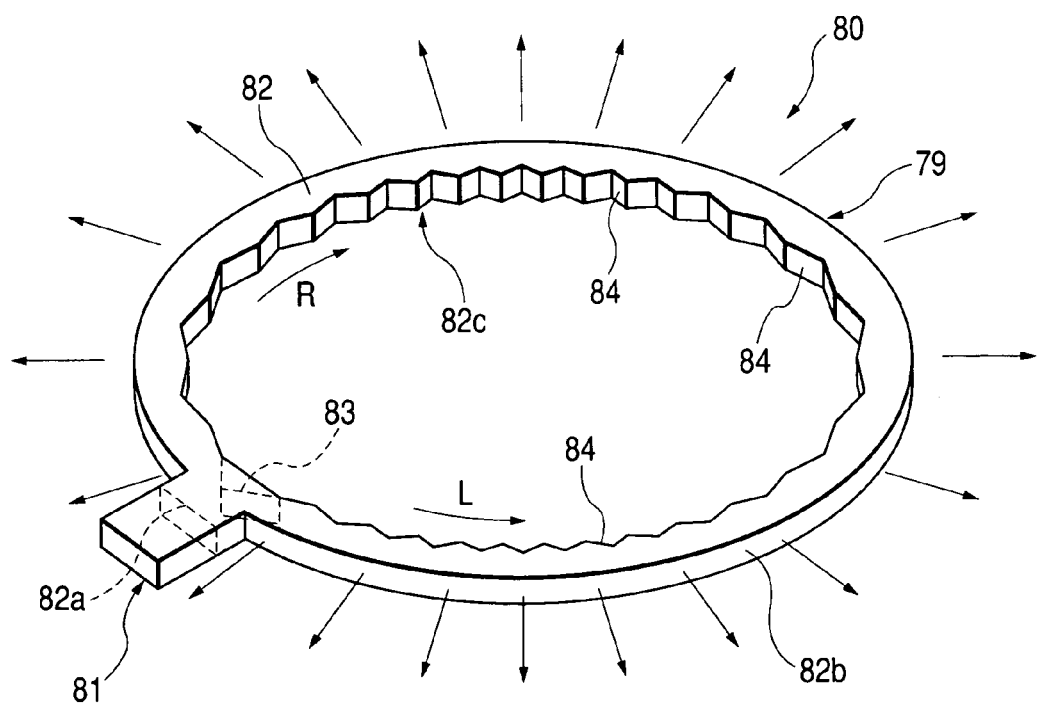
FIG. 7 is a perspective view showing another embodiment mode of the front light of the present invention.

FIG. 7 is a perspective view showing another embodiment mode of the illuminating means of the present invention. A front light (illuminating device) 80 is constructed by a light guide member 79 having an endless light guide body 82 formed by a transparent resin material and approximately having a rectangular shape in section and formed in an annular shape as a whole, and a light source unit 81 for irradiating light into this light guide body 82. An incident face 82a for introducing light irradiated from the light source unit 81 into the light guide body 82 is formed in one portion of the light guide body 82. The light source unit 81 abuts on this incident face 82a and is attached to the light guide body 82.

The outer circumferential side of the annular light guide body 82 constituting the light guide member 79 is set to an annular emitting face 82b for emitting the light introduced to the light guide body 82. In contrast to this, the inner circumferential side of the annular light guide body 82 is set to a reflection face 82c on which many fine reflection grooves 84 formed in a wedge shape in section are formed and the light introduced to the light guide body 82 is reflected toward the emitting face 82b. Further, a reflecting body 83 of a prism shape is formed in a position facing the incident face 82a of the light guide body 82. With respect to the light guide body 82, for example, a resin material such as transparent acrylic resin, etc. is injection-molded in the annular shape, and the reflection grooves 84 constituting the reflection face 82c are then formed in the inner circumference of the light guide body 82, or the reflection face 82c may be also formed at the injection molding time. A transparent resin material such as polycarbonate-based resin, epoxy resin, etc. and glass, etc. in addition to the acrylic-based resin can be used as the material constituting the light guide body 82.

When the light irradiated from the light source unit 81 is introduced into the light guide body 82 from the incident face 82a in the front light 80 of such a construction, this light is divided into light propagated in the annular light guide body 82 in left rotation R by the action of the reflecting body 83 of a prism shape, and light propagated in the annular light guide body 82 in right rotation L. The light propagated within the light guide body 82 in the left rotation R and the light propagated within the light guide body 82 in the right rotation L are reflected on the reflection face 82c of the light guide-body 82, and their propagating directions are changed and these lights are emitted from the inside emitting face 82b of the light guide body 82. Thus, the front light 80 can uniformly illuminate the outside of the annular light guide body 82 in a ring shape without irregularities.

In the front light 10 shown in FIG. 7, the light guide body 82 is formed in the annular shape, but may be formed in an endless shape. For example, the light guide body 82 may be also formed in the shape of a square ring, a triangular ring and an elliptical ring.

As explained above in detail, in accordance with the light guide member and the illuminating device of the present invention, only the same range as the shape of the reflection face is illuminated by the illumination light emitted from the emitting face. If the shape of the reflection face is set to the range actually requiring the illumination, only the range actually requiring the illumination is illuminated and no illumination light is illuminated to its circumference so that the difference in contrast between the circumferential portion and the illumination range is raised and visibility of the illumination range is further raised. Thus, it is possible to provide the light guide body and the illuminating device able to efficiently uniformly irradiate the illumination light in only the area requiring the illumination.

What is claimed is:

1. A light guide member comprising an incident face for introducing light irradiated from a light source; an emitting face spaced apart from said incident face for emitting said light; a reflection face constructed by many reflection stripes widened in a concentric circle shape from a center toward an outside, the reflection face reflecting the light introduced from the incident face toward the emitting face; and a light guide portion for propagating the light between said incident face and said emitting face; wherein said reflection stripes are grooves constructed by a first face having an inclination angle of greater than or equal to about 1 degree and less than or equal to about 10 degrees, and a second face having an inclination angle of greater than or equal to about 41 degrees and less than or equal to about 45 degrees, both inclination angles measure with respect to said emitting face.

2. The light guide member according to claim 1, wherein said reflection stripes are a reflection prism for reflecting said light impinging on the reflection face.

3. The light guide member according to claim 1, wherein a diffusing portion for diffusing said light toward said reflection face is disposed along an optical path from said incident face to said reflection face.

4. The light guide member according to claim 3, wherein said diffusing portion is a reflection prism for reflecting said light impinging on a surface of the diffusion portion.

5. The light guide member according to claim 1, wherein said incident face is formed at the center of the concentric circle of said reflection stripe.

6. The light guide member according to claim 1, wherein a scale is formed on said emitting face, and an opening for extending a driving shaft of a pointer indicating said scale therethrough is formed at the center of the concentric circle of said reflection stripes.

7. An illuminating device comprising the light guide member according to claim 1 and a light source for irradiating light toward the incident face of said light guide member.

8. An illuminating device comprising the light guide member according to claim 1 and a light source for irradiating light toward the incident face of said light guide member.

9. A light guide member comprising an incident face for introducing light irradiated from a light source; an annular light guide body for propagating said light introduced from said incident face; an annular emitting face formed in said light guide body and emitting said light from an area surrounded by said light guide body toward an outside; and a reflection face formed in said light guide body and having many grooves formed in the inner circumference of said light guide body for reflecting said light introduced from said incident face toward said emitting face.

* * * * *